US012614916B2

(12) United States Patent
Lou et al.

(10) Patent No.: US 12,614,916 B2
(45) Date of Patent: Apr. 28, 2026

(54) CHARGING DEVICE, CHARGING CONTROL METHOD, ENERGY MANAGEMENT SYSTEMT AND STORAGE MEDIUM

(71) Applicant: CONTEMPORARY AMPEREX TECHNOLOGY (HONG KONG) LIMITED, Hong Kong (CN)

(72) Inventors: Qidong Lou, Ningde City (CN); Jinbo Cai, Ningde City (CN); Wei Zhang, Ningde City (CN); Zhimin Dan, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 760 days.

(21) Appl. No.: 18/059,446

(22) Filed: Nov. 29, 2022

(65) Prior Publication Data

US 2023/0120625 A1     Apr. 20, 2023

Related U.S. Application Data

(63) Continuation of application No. PCT/CN2022/093862, filed on May 19, 2022.

(30) Foreign Application Priority Data

Oct. 14, 2021     (CN) .......................... 202111198511.5

(51) Int. Cl.
*H02J 7/02*          (2016.01)
*H02J 7/90*          (2026.01)

(52) U.S. Cl.
CPC ................ *H02J 7/927* (2026.01); *H02J 7/02* (2013.01); *H02J 7/933* (2026.01); *H02J 2207/20* (2020.01)

(58) Field of Classification Search
CPC ...... H02J 7/00711; H02J 7/00712; H02J 7/02; H02J 2207/20; H02J 7/0069; H02J 7/0029; H01M 10/44; Y02T 10/70; Y02T 10/7072

(Continued)

(56) References Cited

U.S. PATENT DOCUMENTS

| | | | |
|---|---|---|---|
| 3,622,857 A | 11/1971 | Sethi | |
| 4,829,225 A | 5/1989 | Podrazhansky et al. | |

(Continued)

FOREIGN PATENT DOCUMENTS

| | | | |
|---|---|---|---|
| CN | 101291075 A | | 10/2008 |
| CN | 101312297 A | * | 11/2008 |

(Continued)

OTHER PUBLICATIONS

The Notice of Registration received in the corresponding Chinese Application 202111198511.5, mailed Dec. 22, 2023.

(Continued)

*Primary Examiner* — Julian D Huffman
*Assistant Examiner* — Aiman Bickiya
(74) *Attorney, Agent, or Firm* — K&L Gates LLP

(57)          ABSTRACT

A charging device, a charging control method, an energy management system and a storage medium are provided. The charging device includes: a charging circuit including a voltage stability control circuit, an output port and an input port; the voltage stability control circuit being connected to a high-voltage alternating current through the input port and connected to a battery through the output port, and configured to convert the high-voltage alternating current into a low-voltage direct current, charge the battery with a positive pulse current during a first period and charge the battery with a negative pulse current during a second period; and an energy absorption circuit connected in parallel with the (Continued)

charging circuit and configured to absorb the negative pulse current.

11 Claims, 5 Drawing Sheets

(58) Field of Classification Search
USPC ......................................................... 320/137
See application file for complete search history.

(56) References Cited

U.S. PATENT DOCUMENTS

| | | | |
|---|---|---|---|
| 2014/0225569 A1 | 8/2014 | Yamazaki et al. | |
| 2022/0311262 A1* | 9/2022 | Schmidt ................ | H02J 7/0047 |

FOREIGN PATENT DOCUMENTS

| | | | | |
|---|---|---|---|---|
| CN | 101388560 | A | * | 3/2009 |
| CN | 103427702 | A | | 12/2013 |
| CN | 103812196 | A | | 5/2014 |
| CN | 204118838 | U | | 1/2015 |
| CN | 104614674 | A | | 5/2015 |
| CN | 105119334 | A | | 12/2015 |
| CN | 106564393 | A | | 4/2017 |
| CN | 206564548 | U | | 10/2017 |
| CN | 109873471 | A | * | 6/2019 ............ H01M 10/44 |
| CN | 111409497 | A | | 7/2020 |
| CN | 111564836 | A | | 8/2020 |
| CN | 112751386 | A | | 5/2021 |
| JP | 2000106219 | A | | 4/2000 |
| JP | 2009016324 | A | | 1/2009 |
| JP | 2015213380 | A | | 11/2015 |
| JP | 2017152356 | A | | 8/2017 |
| JP | 2021035286 | A | | 3/2021 |
| KR | 1020170142055 | A | | 12/2017 |
| WO | 2018131427 | A1 | | 7/2018 |

OTHER PUBLICATIONS

The extended European search report received in the corresponding European Application 2275812.7, mailed Nov. 20, 2023.
The Notice of Reasons for Refusal received in the corresponding Japanese Application 2022-552161, mailed Dec. 4, 2023.
International Search Report and Written Opinion received in the corresponding International Application PCT/CN2022/093862, mailed Jul. 20, 2022.
The first Office Action received in the corresponding Korean Application 10-2022-7029740, mailed on Nov. 13, 2024.
Decision of Refusal received in the corresponding Japanese Application 2022-552161, mailed on Apr. 15, 2024.

* cited by examiner

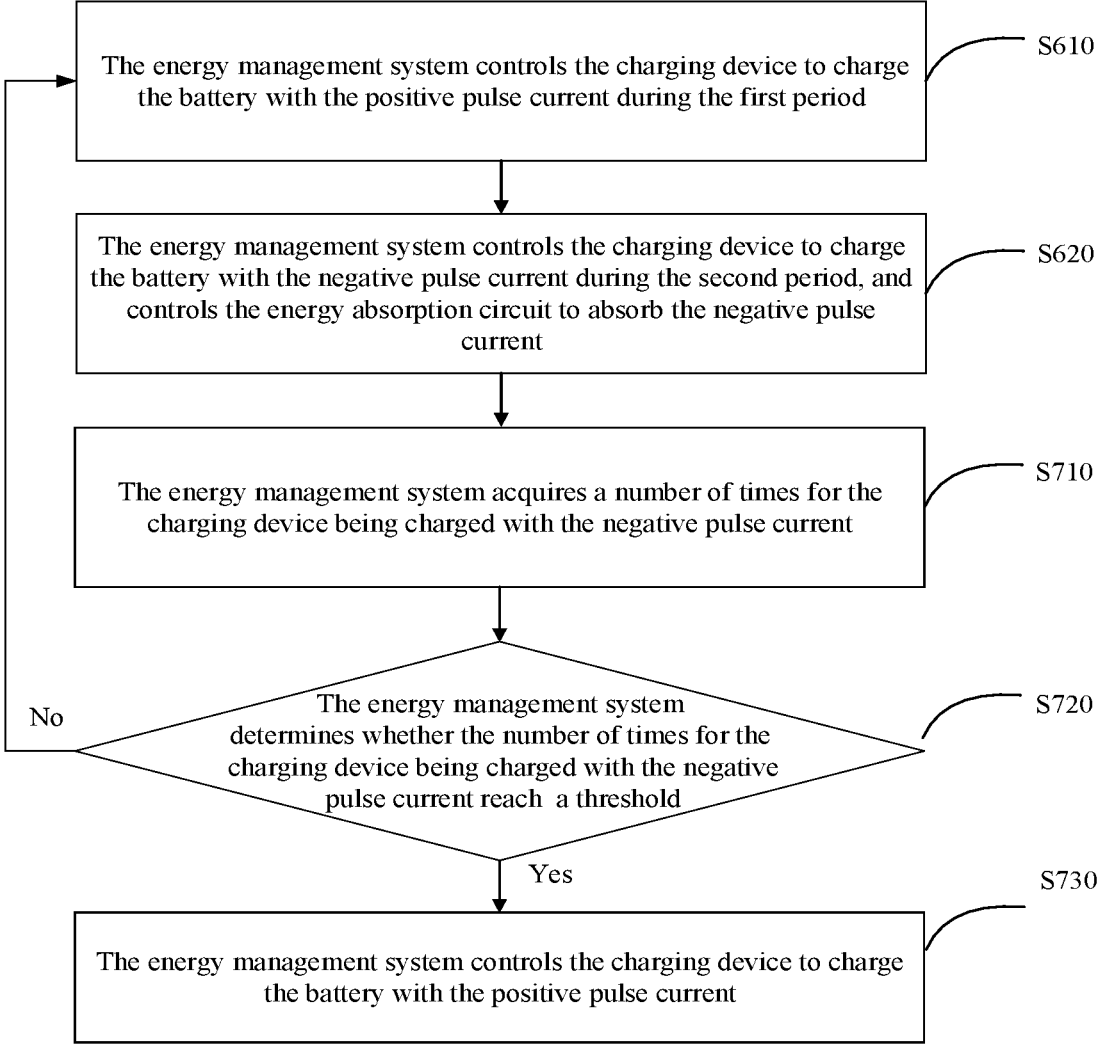

The energy management system controls the charging device to charge the battery with the positive pulse current during the first period — S610

The energy management system controls the charging device to charge the battery with the negative pulse current during the second period, and controls the energy absorption circuit to absorb the negative pulse current — S620

The energy management system acquires a number of times for the charging device being charged with the negative pulse current — S710

The energy management system determines whether the number of times for the charging device being charged with the negative pulse current reach a threshold — S720

No

Yes

The energy management system controls the charging device to charge the battery with the positive pulse current — S730

Fig. 7

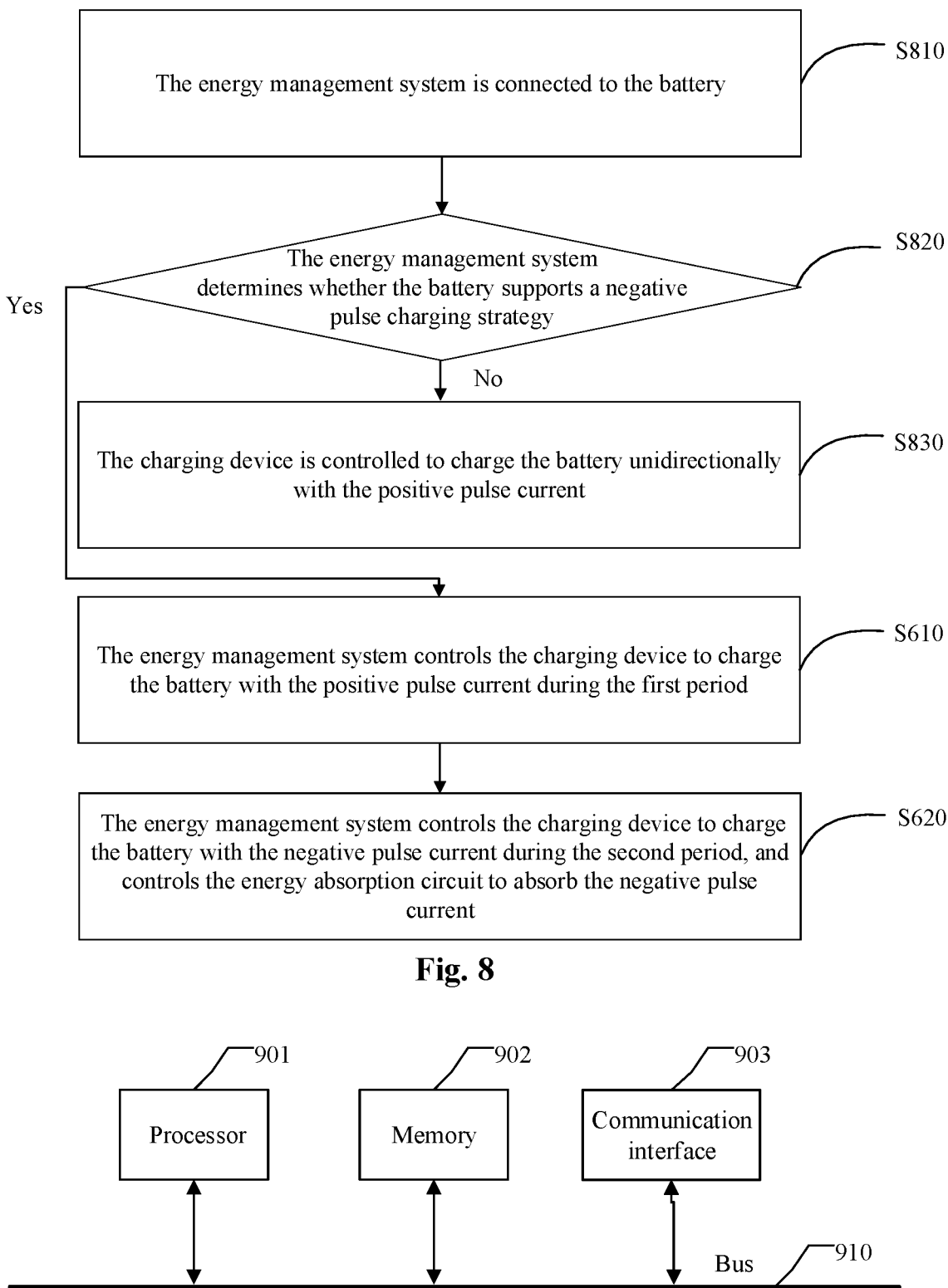

The energy management system is connected to the battery — S810

The energy management system determines whether the battery supports a negative pulse charging strategy — S820

Yes

No

The charging device is controlled to charge the battery unidirectionally with the positive pulse current — S830

The energy management system controls the charging device to charge the battery with the positive pulse current during the first period — S610

The energy management system controls the charging device to charge the battery with the negative pulse current during the second period, and controls the energy absorption circuit to absorb the negative pulse current — S620

Fig. 8

Processor — 901

Memory — 902

Communication interface — 903

Bus — 910

Fig. 9

CHARGING DEVICE, CHARGING CONTROL METHOD, ENERGY MANAGEMENT SYSTEMT AND STORAGE MEDIUM

CROSS-REFERENCE TO RELATED APPLICATIONS

This application is a continuation of International Application PCT/CN2022/093862, filed May 19, 2022, which claims priority to Chinese patent application No. 202111198511.5, entitled "CHARGING DEVICE, CHARGING CONTROL METHOD, ENERGY MANAGEMENT SYSTEMT AND STORAGE MEDIUM", filed on Oct. 14, 2021, which are incorporated herein by reference in their entireties.

TECHNICAL FIELD

The present disclosure relates to the technical field of batteries, and particularly to a charging device, a charging control method, an energy management system and a storage medium.

BACKGROUND

New energy vehicles have been developed rapidly around the world in recent years due to their high energy conversion rate, comfortable driving experience and zero emissions of greenhouse gases and the like. An important criterion for measuring performance of a new energy vehicle is charging time of its rechargeable batteries. The shorter the charging time, the better the user's experience on the new energy vehicle.

Charging technologies for the new energy vehicles that have been put into use generally use a charging pile for quick charge of the new energy vehicle, and most of the related technologies that use the charging pile for the quick charge of batteries include a bidirectional pulse charging method, but this method has limited charging and discharging capacities and cannot achieve super fast charging.

SUMMARY

Various embodiments provide a charging device, a charging control method, an energy management system and a storage medium, which can provide a bidirectional pulse charging method capable of achieving super fast charging.

In a first aspect, an embodiment provides a charging circuit including a voltage stability control circuit, an output port, and an input port;

wherein the voltage stability control circuit is configured to receive a high-voltage alternating current through the input port and connected to a battery through the output port, and is configured to convert the high-voltage alternating current into a low-voltage direct current and charge the battery with a positive pulse current during a first period and with a negative pulse current during a second period; and an energy absorption circuit, being connected in parallel with the charging circuit and being configured to absorb the negative pulse current.

In this way, when the battery is charged with the negative pulse current, a reverse current during the battery is charged with the negative pulse current is absorbed, so that the reverse current will not be absorbed by a power grid, which can reduce an influence on charging and discharging capacities of the battery, and as a result, super fast charging based on a bidirectional pulse charging technology can be achieved.

In an implementation, the energy absorption circuit is further configured to be turned off when the voltage stability control circuit outputs the positive pulse current. This can ensure stable charging of the battery and avoid unnecessary consumption.

In another implementation, the energy absorption circuit includes:

a dissipating device, a first terminal of the dissipating device being connected to a first terminal of the charging circuit;

a first switch connected to a second terminal of the dissipating device and a second terminal of the charging circuit.

This provides an circuit structure of the energy absorption circuit, which achieves flexible activation of the energy absorption circuit.

In another implementation, the energy absorption circuit includes:

a second switch, a first terminal of the second switch being connected to a first terminal of the dissipating device and a second terminal of the second switch being connected to the first terminal of the charging circuit.

In this way, for each of two connection points at which the dissipating device is connected to the charging circuit, a switch device is disposed between the connection point and the dissipating device, which can prevent the switch from being damaged, ensure that the dissipating device is in an open-circuit state when the battery is positively charged, improve charging stability of the battery and reduce unnecessary energy loss and consumption of the charging device.

In yet another implementation, the voltage stability control circuit includes:

an AC-DC module connected to the input port; and a DC-DC module connected to the AC-DC module and the output port.

In this way, while voltage conversion is performed, electrical safety isolation between the battery and a high-voltage side can also be provided, which facilitates power supply for the battery in a stable way.

In yet another optional implementation, the energy absorption circuit is connected between the input port and the AC-DC module;

alternatively, the energy absorption circuit is connected between the AC-DC module and the DC-DC module; and alternatively, the energy absorption circuit is connected between the DC-DC module and the output port.

In a second aspect, an embodiment of the present application provides a charging control method, the method is applied in an energy management system EMS, the EMS being connected to a charging device which is configured as the charging device according to the first aspect and the charging device is further connected to the battery, the method includes:

controlling the charging device to charge the battery with a positive pulse current during a first period;

controlling the charging device to charge the battery with a negative pulse current during a second period, and controlling the energy absorption circuit to absorb the negative pulse current.

In this way, when the battery is charged with the negative pulse current, a reverse current during the battery is charged with the negative pulse current is absorbed, so that the reverse current will not be absorbed by a power grid, which can reduce an influence on charging and discharging capacities of the battery, and as a result, super fast charging based on a bidirectional pulse charging technology can be achieved.

In an implementation, after the energy absorption circuit is controlled to absorb the negative pulse current, the method further includes:

obtaining a number of times for the charging device being charged with the negative pulse current;

controlling the charging device to charge the battery unidirectionally with the positive pulse current when the number reaches a threshold; and controlling the charging device to charge the battery with the positive pulse current during the first period when the number does not reach the threshold.

This can help achieve a flexible combination of unidirectional charging (that is to say, continuously charging the battery with a positive pulse current) and bidirectional pulse charging.

In another implementation, before the charging device is controlled to charge the battery with the positive pulse current during the first period, the method further includes:

connecting the energy management system to the battery;

controlling the charging device to charge the battery unidirectionally with the positive pulse current when the battery does not support a negative pulse charging strategy; and controlling the charging device to charge the battery with the positive pulse current during the first period when the battery supports the negative pulse charging strategy.

In this way, the battery can be charged under a corresponding strategy according to a supportable charging strategy, which achieves precise charging of the battery.

In a third aspect, an embodiment of the present application provides an energy management system, the energy management system includes a processor, and a memory, wherein programs or an instructions are stored on the memory and executable on the processor, the programs or an instructions, when executed by the process, perform the steps of the method in the second aspect.

In a fourth aspect, an embodiment of the present application provides a readable storage medium having programs or instructions stored thereon, wherein the programs or instructions, when executed by the processor, perform the steps of the method in the second aspect.

In various embodiments, the charging circuit of the charging device is connected in parallel with the energy absorption circuit, wherein the voltage stability control circuit in the charging circuit charges the battery with a positive pulse current during a first period; and the voltage stability control circuit in the charging circuit charges the battery with a negative pulse current value during a second period, and meanwhile, the energy absorption circuit absorbs the negative pulse current. In this way, when the battery is charged with the negative pulse current, a reverse current during the battery is charged with the negative pulse current is absorbed, so that the reverse current will not be absorbed by a power grid, which can reduce an influence on charging and discharging capacities of the battery, and as a result, super fast charging based on a bidirectional pulse charging technology can be achieved.

BRIEF DESCRIPTION OF THE DRAWINGS

The drawings necessary for explaining embodiments are described briefly below to illustrate the technical solutions of the embodiments of the present application more clearly. Obviously, the drawings described below illustrate merely some embodiments of the present application. Other figures can be obtained by those with ordinary skill in the art from those drawings without any inventive efforts.

FIG. 7 is another flowchart of a charging control method according to an embodiment of the present application.

FIG. 8 is another flowchart of a charging control method according to an embodiment of the present application.

FIG. 9 is a schematic structural view of hardware of an electronic device according to an embodiment of the present application.

Figure 1:
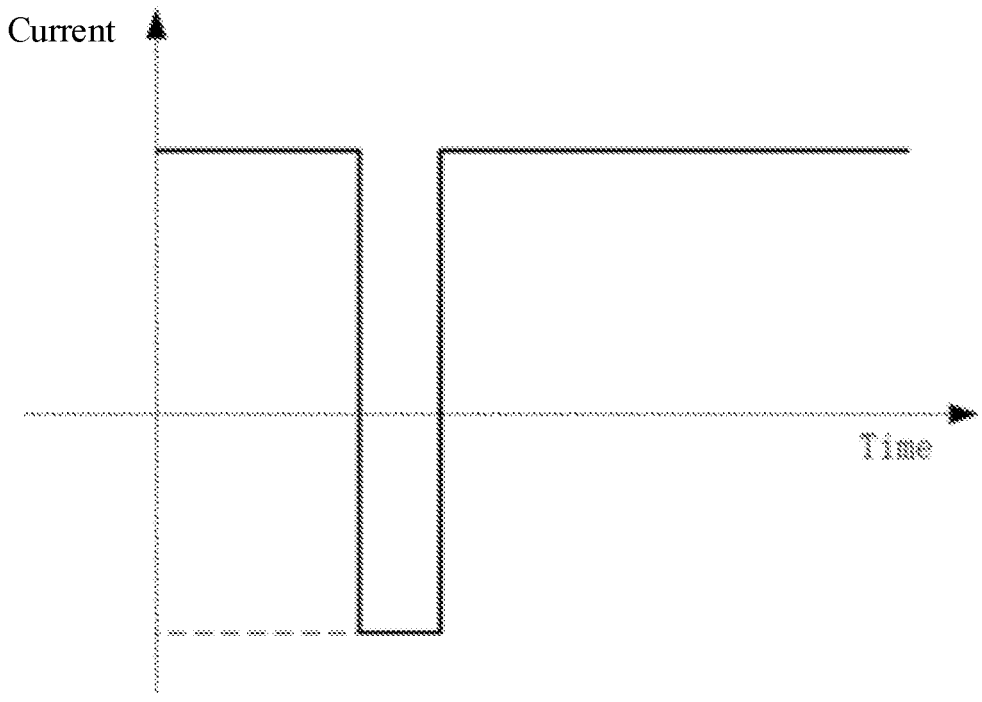
FIG. 1 is a time sequence view of bidirectional pulse charging in an embodiment of the present application.

In the drawings, the drawings may not be drawn according to actual scale.

Reference signs: Charging device 10, Charging circuit 11, Energy absorption circuit 12, Input port 111, Voltage stability control circuit 112, Output port 113, AC-DC module 1121, DC-DC module 1122, First switch S1, Dissipating device R, Second switch S2, and Battery 20.

DETAILED DESCRIPTION

Implementations in accordance with the present disclosure are described in further detail below with reference to the drawings and embodiments. The detailed description and drawings of the following embodiments are used to exemplarily illustrate the principles of the present application instead of limiting the scope of the present application. That is, the present application is not limited to the described embodiments.

Herein, it is noted that, unless otherwise specified, the term "a plurality of" refers to two or more; the terms "upper", "lower", "left", "right", "inner", "outer", and the like indicate orientations or positional relationships for merely facilitating and simplifying description of the present application, and do not indicate or imply that the involved devices or elements must have a particular orientation, must be constructed and operated in a particular orientation, and thus should not be construed as limiting the present application. In addition, the terms "first", "second", "third", and the like are used for descriptive purposes only and should not be construed as indicating or implying relative importance. The term "perpendicular" does not indicate perpendicular in the strict sense, but may be within a tolerance. The term "parallel" does not indicate parallel in the strict sense, but may be within a tolerance.

The directional words appearing in the following description indicate directions shown in the drawings and do not limit the specific structure of the present application. In the description of the present application, it should be further noted that, unless otherwise expressly specified and limited, the terms "installed", "connected" and "connection" should be understood in a broad sense, for example, they may refer to a fixed connection, and may also refer to a detachable connection, or an integral connection; it may refer to a direct connection, and may also refer to an indirect connection through an intermediate medium. For those with ordinary skills in the field, the specific meaning of the terms mentioned above in the present application can be understood in accordance with specific conditions.

In the field of new energies, a power battery may be used as a main power source of a power consumption device (such as a vehicle, a ship or a spacecraft, etc.), and an energy storage battery may be used as a charging source of the power consumption device. The importance of both is self-evident. As an example but not as a limitation, in some application scenarios, the power battery may be a battery in the power consumption device, and the energy storage battery may be a battery in a charging device. For convenience of description, the power battery and the energy storage battery may be collectively referred to as a battery in the following descriptions.

At present, most of batteries on the market are rechargeable batteries, and the most common ones are lithium batteries, such as lithium ion batteries or lithium ion polymer batteries. During a charging process, continuous charging is generally used to charge the battery, but the continuous charging of the battery will cause the battery to yield lithium precipitation and heat generation, which not only degenerate performance of the battery and greatly shorten life cycle of the battery, but also limit fast charging capacity of the battery, and may cause catastrophic consequences such as combustion and explosion, leading to serious safety problems.

As a result, there appears a bidirectional pulse charging method, by which the battery, when being charged, is intermittently pulsed to discharge, or in other words, the battery is charged with a negative pulse current, as shown in FIG. 1. Theoretically, when the battery is charged with a positive pulse current, a polarization voltage generated in the battery will prevent itself from being charged; and when the charging is stopped, resistance polarization disappears, and concentration polarization and electrochemical polarization are gradually weakened. If a discharge channel is provided for the battery to output a reverse pulse current, the electrochemical polarization will disappear rapidly, and at the same time, temperature in the battery will also decrease because of discharging.

Thus, the bidirectional pulse charging method may be configured to timely suspend an output of the positive pulse current to the battery and add the negative pulse current in an appropriate way in a charging process of the battery, so that various polarization voltages can be eliminated quickly and effectively, which improves charging speed and prevents occurrence of the lithium precipitation and heat generation or the like.

However, the inventors of the present application has found that when the battery is charged by the bidirectional pulse charging method, for example, in an application scenario where the battery is installed in a power consumption device, such as in a car, and when the battery in the car is charged through a charging pile, the battery outputs a negative pulse current, and the negative pulse current passes through the charging device and is finally absorbed by a power grid. When energy brought by the negative pulse current goes beyond a range allowed by the power grid, the battery cannot be connected to the grid for being discharged. As a result, the bidirectional pulse charging technology allows limited charging and discharging capacities, so that super fast charging for the battery cannot be achieved.

In order to solve the technical problems above, the present application presents a charging device, a charging control method, an energy management system and a storage medium. A charging device is provided with a charging circuit, which can convert a high-voltage alternating current into a low-voltage direct current, and charging device charges a battery with a positive pulse current during a first period and charges the battery with a negative pulse current during a second period, which achieves bidirectional pulse charging of the battery. An energy absorption circuit is further disposed in parallel with the charging circuit, and is configured to absorb, when the battery is charged with the negative pulse current by a voltage stability control circuit, a reverse current during the battery is charged with the negative pulse current, so that the reverse current will not be absorbed by the power grid, and there will not be a situation where discharging cannot be done which the battery is coupled with the power grid, that is to say, charging and discharging capacities of the battery will not be affected. As a result, super fast charging based on the bidirectional pulse charging technology can be achieved, and a risk of lithium precipitation of the battery caused by continuous high current charging of the battery can be eliminated.

It should be noted that the charging device mentioned above may charge a power consumption device for which the battery is used as a power source. The power consumption device may be, but not limited to be, a mobile phone, a tablet, a notebook computer, an electric toy, an electric tool, a battery vehicle, an electric vehicle, a ship, a spacecraft, and the like. The charging device may be a charging pile, a charging gun, a charging cabinet, and the like.

Figure 2:
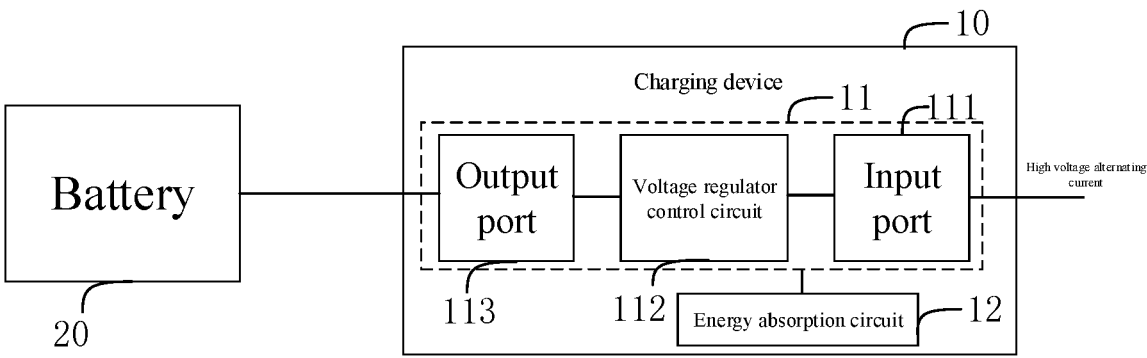
FIG. 2 is a structural block view of a charging device in an embodiment of the present application.

Referring to FIG. 2, in some embodiments, a charging device 10 may include a charging circuit 11 and an energy absorption circuit 12. The charging circuit 11 includes a voltage stability control circuit 112, an output port 113 and an input port 111.

The voltage stability control circuit 112 may be connected to a high-voltage alternating current through the input port 111, that is to say, the input port 111 is a port where the charging device 10 is connected to a power grid that provides the high-voltage alternating current. The voltage stability control circuit 112 may also be connected to a battery 20 though the output port 113. Exemplarily, the output port 113 may be a plug port of a charging gun adapted to a charging port of the battery 20.

The voltage stability control circuit 112 may be configured to convert the high-voltage alternating current into a low-voltage direct current and charge the battery 20 with a positive pulse current during a first period and charge the battery 20 with a negative pulse current during a second period.

The energy absorption circuit 12 may be connected in parallel with the charging circuit 11, and the energy absorption circuit 12 may be configured to absorb the negative pulse current.

In the embodiment of this application, the charging circuit 11 of the charging device 10 is connected in parallel with the energy absorption circuit 12, wherein the voltage stability control circuit 112 in the charging circuit 11 charges the battery 20 with a positive pulse current value during the first period; and the voltage stability control circuit 112 in the charging circuit 11 charges the battery 20 with a negative pulse current value during the second period, and at this point, the energy absorption circuit 12 absorbs the negative pulse current. In this way, when the battery 20 is charged with the negative pulse current, a reverse current of the negative pulse charging current for the battery 20 can be absorbed, so that the reverse current is not absorbed by the power grid, which can reduce an influence on charging and discharging capacities of the battery 20, and super fast charging based on the bidirectional pulse charging technology can be achieved.

The charging circuit 11 may also be referred to as a basic and main charging circuit, which may refer to a circuit where the power grid-charging device 10-battery 20 ultimately form a complete charging and discharging process in the charging device 10 after the charging device 10 is connected to the power grid and the battery 20.

Specifically, in this embodiment, the power grid may be configured to provide the high-voltage alternating current, and the charging device 10 may be configured to process the high-voltage alternating current mainly through the voltage stability control circuit 112 in the charging circuit 11, for example, power distribution may be performed according to power provided by the assembled power grid and power required by the battery 20, and finally an adjusted stable low-voltage direct current may be provided to the battery 20.

In the process of the power grid providing a stable low-voltage direct current to the battery 20, the power grid may be configured to provide the power to the battery 20 according to the bidirectional pulse charging method. Referring to FIG. 1 and FIG. 2 together, the voltage stability control circuit 112 may be configured to charge the battery 20 with the positive and negative pulse currents alternately, where the current direction changes periodically. That is to say, a process where the battery 20 is charged with the negative pulse current or a stage where the battery 20 is discharged may be arranged between two periods of time sequences during which the battery 20 is charged with the positive pulse current.

In an optional example illustrated by reference to FIG. 1, the first period may be longer than the second period, for example, the second period may be 2 seconds, while the first period during which the low-voltage direct current is output with the positive pulse current for the first time may be 5 seconds. It should also be noted that the first period and the second period in subsequent implementation of the bidirectional pulse charging may be or may not be consistent with each other, which can be configured specifically according to actual needs. Magnitude of the positive pulse current may be or may not be the same as magnitude of the negative pulse current.

In the case where the charging device 10 charges the battery 20 by the bidirectional pulse charging method, if the battery 20 is discharged such that the current output by the voltage stability control circuit 112 is the negative pulse current, the energy absorption circuit 12 connected in parallel with the charging circuit 11 may function at this point to absorb energy discharged from the battery 20.

The energy absorption circuit 12 may be an additional consumption unit added to the charging circuit 11 or may be other modules capable of achieving energy absorption, and may also be other power consumption devices. The energy absorption circuit 12 can absorb energy brought by the negative pulse current, and its core absorption principle is to convert electrical energy into other energy for consumption, for example, energy consumption may be achieved by means of dissipating. Other forms of energy mentioned above may not be limited to heat energy, light energy, mechanical energy, and electromagnetic energy, etc., and the dissipating may be consumption of a single kind of energy or a collection of multiple kinds of energies. Exemplarily, the energy absorption circuit 12 may be a single resistor or multiple resistors.

The bidirectional pulse charging is thus implemented normally by means of energy dissipating, which prevents the reverse pulse current from being provided to a high-voltage side of the high-voltage alternating current, for example from being absorbed by the power grid, and thus charging and discharging capacities of the battery 20 will not be influenced. As a result, super fast charging can be achieved under a situation of supporting the bidirectional pulse charging, and lithium precipitation caused by continuous charging can be mitigated and life expectancy of the battery 20 can be increased.

In order to reduce unnecessary consumption caused by the energy absorption circuit 12 and ensure that the battery 20 is charged stably when the voltage stability control circuit 112 charges the battery 20 with the positive pulse current, the energy absorption circuit 12 may be turned off when the voltage stability control circuit 112 outputs the positive voltage current.

In an example, a switching element may be provided to achieve direct absorption of the discharged negative pulse energy when the battery 20 is discharged and achieve turn-off of the energy absorption circuit 12 when the battery 20 is charged with the positive pulse current such that the energy absorption circuit 12 is in a bypass state. This can ensure stable charging of the battery 20 and avoid unnecessary consumption.

Figure 3:
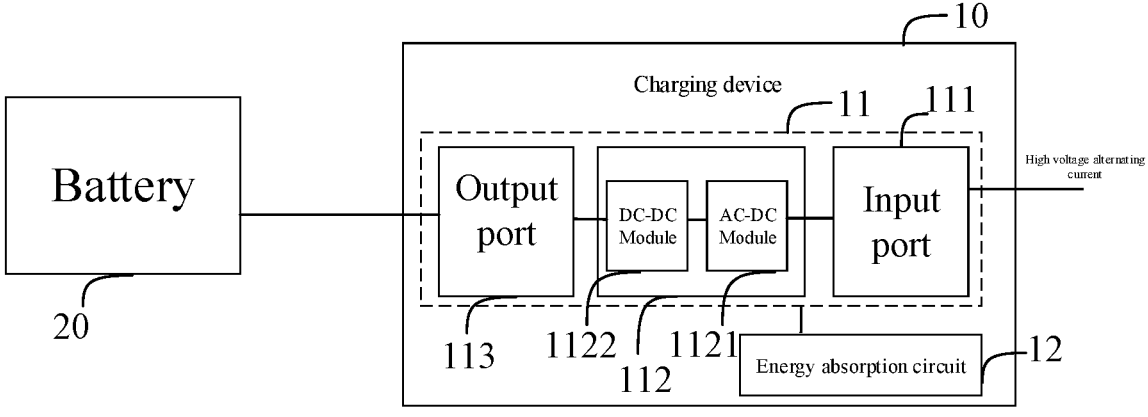
FIG. 3 is another structural block view of a charging device in an embodiment of the present application.

In another example, in order to make the voltage stability control circuit 112 provide complete functions, referring to FIG. 2 and FIG. 3 together, the voltage stability control circuit 112 may include an AC-DC (Alternating Current-Direct Current) module 1121 and a DC-DC (Direct Current-Direct Current) module 1122. The AC-DC module 1121 is connected to the input port 111. The DC-DC module 1122 is connected to the AC-DC module 1121 and the output port 113.

The AC-DC module 1121 may be an AC-DC and DC-AC conversion bidirectional inverter, which can convert an alternating current provided by the power grid into a direct current so as to charge the battery 20.

The DC-DC module 1122 may include a single or multiple DC-DC unit(s), and can convert the high-voltage direct current of the AC-DC module into a low-voltage direct current to charge the battery 20. In addition to achieve voltage conversion, the The DC-DC module 1122 can also provide electrical safety isolation between the battery 20 and a high-voltage side to felicitate stable power supply for the battery 20.

It should be noted that when the voltage stability control circuit 112 charges the battery 20 with the positive pulse current, the high-voltage alternating current charges the battery 20 through the AC/DC module 1121; and when the voltage stability control circuit 112 charges the battery 20 with the negative pulse current, the AC/DC module 1121 is turned off, and at this point, the way for the negative pulse current to flow into the input port 111 is blocked, that is to say, the power grid cannot receive the current discharged by the battery 20. The energy absorption circuit 12 is activated to absorb the negative pulse current.

As long as the energy absorption circuit 12 is connected in parallel with the charging circuit 11 and can achieve absorption of the negative pulse current, a connection position of the energy absorption circuit 12 may be arranged according to actual needs based on the connection structures of the AC-DC module 1121 and the DC-DC module 1122 provided by the voltage stability control circuit 112.

Exemplarily, the energy absorption circuit 12 may be connected between the input port 111 and the AC-DC module 1121. Alternatively, the energy absorption circuit 12 may be connected between the AC-DC module 1121 and the DC-DC module 1122; alternatively, the energy absorption circuit 12 may be connected between the DC-DC module 1122 and the output port 113.

It should also be noted that the DC-DC module 1122 may be provided with one or more switches for achieving connection in series or in parallel and flexible control of multiple DC-DC units, such that the charging device 10 can provide a variety of charging services with different voltage specifications for the battery 20 according to adjustment of the switches, which improves service selectivity of the charging device 10.

Figure 4:
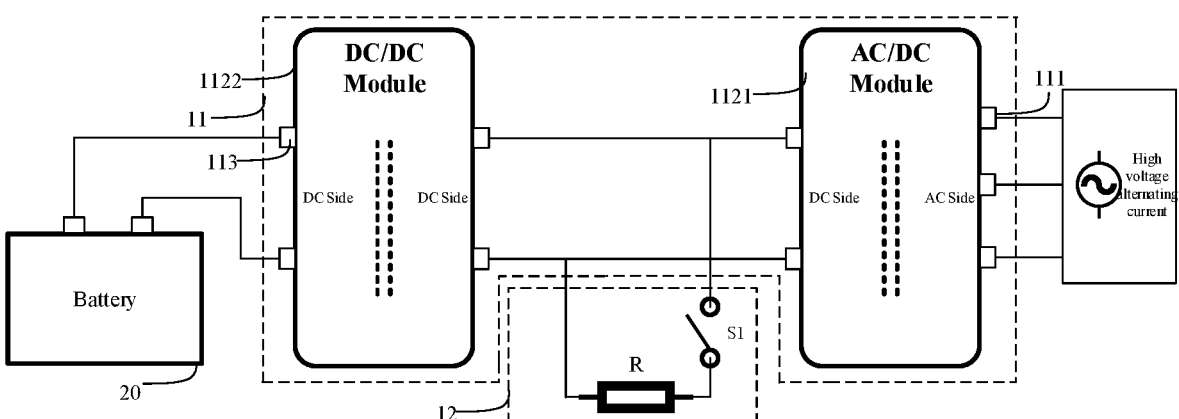
FIG. 4 is a schematic structural view of a circuit of a charging device in an embodiment of the present application.

Referring to FIG. 2 and FIG. 4, FIG. 4 illustrates a schematic structural view of an optional circuit of the charging device 10, and particularly a schematic structural view of an optional circuit of the energy absorption circuit 12. In this alternative example, the energy absorption circuit 12 includes a dissipating device R and a first switch S1.

A first terminal of a dissipating device R is connected to a first terminal of the charging circuit 11. A first switch S1 is connected to a second terminal of the dissipating device R and a second terminal of the charging circuit 11.

Exemplarily, the dissipating device R may be a single or multiple resistor(s) connected in series, such as a power resistor, and may be a high power consumption device.

Exemplarily, the first switch S1 may be a mechanical switch, an electronic switch or other device with a function of switch, and the first switch S1 may be integrated in the voltage stability control circuit 112 and provided by a device with a function of switch in the voltage stability control circuit 112.

It should also be noted that, in a situation where the first switch S1 is integrated in the voltage stability control circuit 112, when the negative pulse current is outputted, an original AC-DC conversion function of the voltage stability control circuit 112 may be turned off, that is to say, the AC-DC module 1121 may be turned off, which may prevent energy brought by the reverse discharging of the battery 20 from being transmitted from a direct current side to an alternating current side and prevents a power grid for providing the high-voltage alternating current from being impacted.

In this way, in this example, an optional circuit structure of the energy absorption circuit 12 is provided, which can achieve flexible activation of the energy absorption circuit 12.

Figure 5:
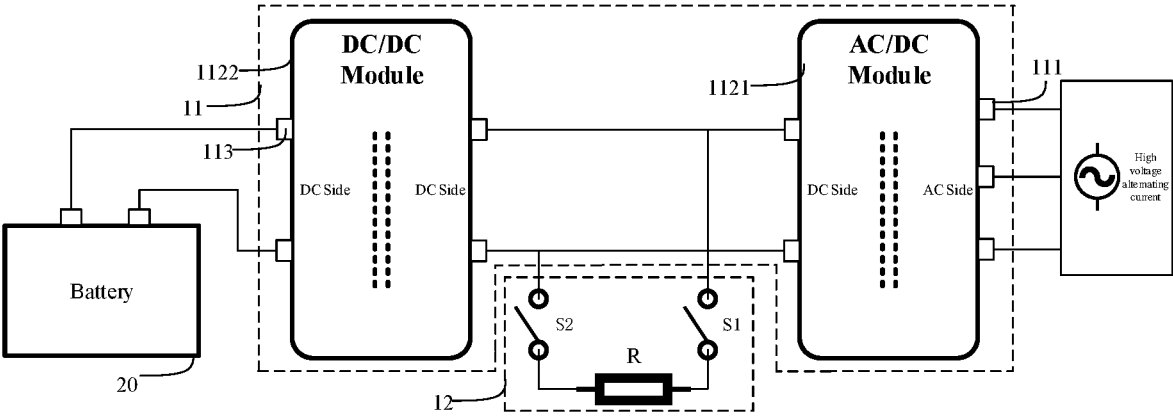
FIG. 5 is a schematic structural view of another circuit of a charging device in an embodiment of the present application.

Further, referring to FIG. 2 and FIG. 5, the energy absorption circuit 12 may further include a second switch S2, wherein a first terminal of the second switch S2 is connected to the first terminal of the dissipating device R, and a second terminal of the second switch S2 is connected to the first terminal of the charging circuit 11.

That is to say, there are two switches having switchable states in the energy absorption circuit 12. The type of the second switch S2 may be the same as or similar to that of the first switch S1, and will not be repeated here. It should be noted that, both of the first switch S1 and the second switch S2 can be turned on when the voltage stability control circuit 112 charges the battery 20 with the negative pulse current, that is to say, when the battery 20 is discharged reversely, so that the dissipating device R in the energy absorption circuit 12 can directly absorb the discharged energy brought by the reversely discharging. When the voltage stability control circuit 112 charges the battery 20 with the positive pulse current, the first switch S1 and the second switch S2 are both turned off such that the energy absorption circuit 12 is turned off and be in a bypass state.

In this way, for each of connections points of the dissipating device R with the charging circuit 11, there is a switch device between the connection point and the dissipation device R, which can prevent the switches from being damaged, ensure that the dissipating device R is in an open-circuit state when the battery 20 is positively charged, improve charging stability of the battery 20 and reduce unnecessary energy loss and consumption of the charging device 10.

In yet another optional example, since it requires that the energy absorption circuit 12 achieve absorption of the negative pulse current and the charging device 10 may generate a large amount of heat loss during the charging process, a heat dissipation unit may further be provided in the charging device 10. Corresponding heat dissipating measures may be selected according to a required power and heat dissipating environment in an actual application, which include but are not limited to water cooling and air cooling.

Figure 6:
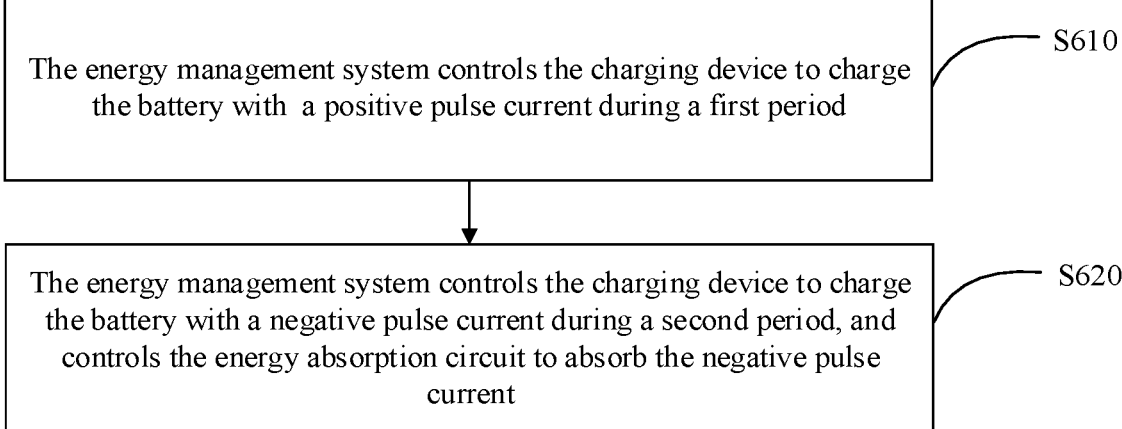
FIG. 6 is a flowchart of a charging control method according to an embodiment of the present application.

Based on the alternative structures of the charging device shown in FIG. 2 to FIG. 5, there is provided a charging control method in an embodiment of the present application, as shown in FIG. 6. The charging control method include the following steps S610 and S620.

At the step S610, the energy management system controls the charging device to charge the battery with a positive pulse current during a first period.

At the step S620, the energy management system controls the charging device to charge the battery with a negative pulse current during a second period, and controls the energy absorption circuit to absorb the negative pulse current.

It should be noted that the charging device in the steps S610 and S620 may refer to those described in the embodiments shown in FIG. 1 to FIG. 5. The energy management system (EMS) is electrically connectable to the charging device such that the charging device and the energy management system constitute a charging system. The energy management system may be configured as a processor for controlling a strategy of the charging device, and facilitates communication of the charging device with an outside world.

In addition, the energy management system may be disposed in the charging device or may be disposed separately outside the charging device to control the charging device. When the energy management system is disposed in the charging device, an auxiliary source system may be disposed in the charging device to provide basic energy for the energy management system implementing the control.

In one embodiment, the energy management system controls the voltage stability control circuit to charge the battery with the positive pulse current value during the first period; and controls the voltage stability control circuit to charge the battery with the negative pulse current value during the second period, and meanwhile, controls the energy absorption circuit to absorb the negative pulse current. In this way, when the battery is charged with the negative pulse current, a reverse current during the battery is charged with the negative pulse current is absorbed, so that the reverse current will not be absorbed by a power grid, which can reduce an influence on charging and discharging capacities of the battery, and as a result, super fast charging based on a bidirectional pulse charging technology can be achieved.

Referring to FIG. 7, in an optional example of the charging control method, in addition to the steps S610 and S620, the method further includes the steps S710-S730 after the step S620.

At the step S710, the energy management system acquires a number of times for the charging device being charged with the negative pulse current;

At the step S720, the energy management system determines whether the number of times for the charging device being charged with the negative pulse current reach a threshold. If yes, the step S730 is performed; else, the method returns to the step S610.

At the step S730, the energy management system controls the charging device to charge the battery with the positive pulse current.

It should be noted that in the process of implementing battery charging in this embodiment, a number of times for the charging device being charged with the negative pulse current is counted, that is to say, an accumulative number of times for the battery being discharged reversely is obtained. Since excessive reverse discharging will affect charging effects of the battery, such limited performance of the bidirectional pulse charging method can effectively prevent lithium precipitation of the battery to the maximum extent and ensure fast charging of the battery.

The threshold is set in view of this, and is compared with the number of times for the charging device being charged with the negative pulse current to facilitate a flexible combination of a unidirectional charging (that is to say, the battery is continuously charged with the positive pulse current) and the bidirectional pulse charging.

Referring to FIG. 8, in yet another optional example of the charging control method, in addition to the steps S610 and S620, the method may further includes steps S810-S830 before the step S610.

At the step S810, the energy management system is connected to the battery.

At the step S820, by the energy management system determines whether the battery supports a negative pulse charging strategy. If not, the step S830 is performed; else, the step S610 is performed.

At the step S830, the charging device is controlled to charge the battery unidirectionally with the positive pulse current.

Connecting the energy management system to the battery may mean that the energy management system achieves communication with and connection to the battery, and the communication and connection may be achieved before the battery is charged but after the output port in the charging device is connected to an external battery.

The energy management system may obtain parameter information of the battery according to a communication protocol, determine a charging strategy that the battery can support based on the parameter information, and charge the battery under a corresponding strategy according to the supportable charging strategy, which achieves precise charging of the battery.

An charging control process of a charging system including the charging device and the energy management system will be described below with reference to FIG. 6 to FIG. 8.

After the output port in the charging device is connected to the battery, the energy management system is connected to the battery in communication. The charging system can perform charging self-check according to a standard charging and discharging protocol. After the charging self-check is passed, the energy management system determines current status of the battery according to a communication protocol of the battery and may also determine whether the battery supports the negative pulse charging (whether the battery supports the bidirectional pulse charging method) according to the parameter information obtained from the communication protocol.

If the battery supports the negative pulse charging, the energy management system send a charging instruction to each module in the voltage stability control circuit and the energy absorption circuit The charging instruction may include an amplitude of the positive pulse current and an amplitude of the negative pulse current and a pulse width for the bidirectional pulse charging.

The AC/DC module in the voltage stability control circuit receives the charging instruction sent by the energy management system and convert a high-voltage alternating current of the power grid into a direct current voltage and a positive pulse current according to the preset values in the charging instruction, so as to charge the external battery after reduction of the voltage and/or electrical isolation by the DC/DC module.

When both of the energy management system and the AC/DC module determine that the time period for positively charging reaches a preset strategic value (for example, the first period), the energy management system controls the AC/DC module to be turned off though communication and stops outputting. At this point, the energy absorption circuit is connected to the charging circuit, then the energy management system controls the DC/DC module to discharge the battery in reverse according to strategy requirements, and the voltage stability control circuit charges the battery with the negative pulse current. The energy absorption circuit absorbs the negative pulse current.

When both the energy management system and the DC/DC module determine that the time period for discharging reversely reaches a preset strategic value (for example, the second period), that is to say, the time period meets time requirements for reverse, the energy management system controls the energy absorption circuit to be turned off through communication, and the AC/DC module restarts outputting and continues to charge the battery according to the charging instruction.

When the energy management system, or both the energy management system and the battery determine(s) that a number of times for charging with the negative pulse current reach a threshold, or the battery does not support the bidirectional pulse charging, the charging system enter a regular unidirectional charging mode.

In addition, the energy management system and the battery may also monitor key parameters of the battery and the entire charging system on a real time basis. Exemplary key parameters may include at least one of battery power, cell voltage, temperature, and status of components in the charging device. Once there is a malfunction, the charging stops.

FIG. 9 shows a schematic structural view of hardware of an energy management system according to an embodiment of the present application. The energy management system include a processor 901 and a memory 902 having computer programs instructions stored thereon.

Specifically, the processor 901 may include a central processing unit (CPU), or an application specific integrated circuit (ASIC), or one or more integrated circuit(s) configured to implement the embodiments of the present application.

The memory 902 may include a mass memory for storing data or instructions. As an example but not as a limitation, the memory 902 may include a hard disk drive (HDD), a floppy disk drive, a flash memory, an optical disk, a magneto-optical disk, a magnetic tape, or a universal serial bus (USB) drive or any combination of two or more of them. When appropriate, the memory 902 may include a removable or non-removable (or fixed) medium. When appropriate, the memory 902 may be disposed inside or outside of a comprehensive gateway disaster recovery device. In a certain embodiment, the memory 902 may be a non-volatile solid state memory.

The memory 902 may include a read only memory (ROM), a flash memory device, a random access memory (RAM), a magnetic disk storage media device, an optical storage media device, an electrical, optical or other physical/tangible memory storage device. Thus, the memory 902 generally includes one or more tangible (non-transitory) computer-readable storage media (for example, memory devices) encoded with software which includes computer-executable instructions, the software, when executed (for example, by one or more processors), is operable to perform the operations described with reference to the methods according to various aspects of the present disclosure.

The processor 901 reads and executes the computer program instructions stored in the memory 902 to implement any one of the charging control methods in the embodiments described above.

In one example, the energy management system may further include a communication interface 903 and a bus 910. As shown in FIG. 9, the processor 901, the memory 902, and the communication interface 903 are connected through the bus 910 and achieve mutual communication with each other.

The communication interface 903 is mainly configured to achieve communication between the modules, apparatuses, units and/or devices in the embodiments of the present application.

The bus 910 includes hardware, software, or both of them, and is configured to couple components of the energy management system to each other. As an example but not as a limitation, the bus may include an Accelerated Graphics Port (AGP) or other graphics bus, an Enhanced Industry Standard Architecture (EISA) bus, a Front Side Bus (FSB), a HyperTransport (HT) interconnect, an Industry Standard Architecture (ISA) bus, an Infiniband interconnect, a Low Pin Count (LPC) bus, a memory bus, an Microchannel Architecture (MCA) bus, a Peripheral Component Interconnect (PCI) bus, a PCI-Express (PCI-X) bus, a Serial Advanced Technology Attachment (SATA) bus, a Video Electronics Standards Association Local (VLB) bus or any other suitable bus or a combination of two or more of them. When appropriate, the bus 910 may include one or more buses. Although the embodiments of the present application describe and illustrate a particular bus, any suitable bus or interconnect is also anticipated in the present application.

The energy management system may be based on a charging control method to implement the charging control method described with respect to FIG. 6 to 8.

In addition, the embodiments of the present application may provide a computer storage medium for implementing the charging control methods described in the embodiments above. The computer storage medium stores computer program instructions thereon, the computer program instructions, when executed by the processor, perform any one of the charging control methods described in the embodiments above. Examples of the computer storage medium may include a tangible (non-transitory) computer-readable storage medium such as an electronic circuit, a semiconductor memory device, an ROM, a flash memory, an erasable ROM (EROM), a floppy disk, a CD-ROM, an optical disk, a hard disk, and the like.

Although the present application has been described with reference to the preferred embodiments, various modifications can be made thereto and components thereof can be replaced with their equivalents without departing from the scope of the present application. In particular, various technical features described in various embodiments can be combined in any manner as long as there is no structural conflict. The present application is not limited to the specific embodiments described herein, and includes all technical solutions that fall within the scope of the claims.

What is claimed is:

1. A charging system device, comprising:
   a charging device, wherein the charging device comprises a charging circuit, the charging circuit comprises a voltage stability control circuit, an output port, and an input port, the charging circuit is configured to receive a high-voltage alternating current through the input port and is connected to a battery through the output port, the voltage stability control circuit is configured to convert the high-voltage alternating current into a low-voltage direct current;
   an energy absorption circuit connected in parallel with the charging circuit;
   an energy management system (EMS) electrically connected to the charging device, wherein the EMS is configured to:
   control the charging device to charge the battery unidirectionally with a positive pulse current of the low-voltage direct current when the battery does not support a negative pulse charging strategy;
   control the charging device to charge the battery with a positive pulse current during a first period when the battery supports the negative pulse charging strategy; and
   control the charging device to charge the battery with a negative pulse current of the low-voltage direct current during a second period, and control the energy absorption circuit to absorb the negative pulse current.

2. The charging system of claim 1, wherein the energy absorption circuit is further configured to be turned off when the voltage stability control circuit outputs the positive pulse current.

3. The charging system of claim 1, wherein the energy absorption circuit comprises:
   a dissipating device, a first terminal of the dissipating device being connected to a first terminal of the charging circuit; and
   a first switch connected to a second terminal of the dissipating device and a second terminal of the charging circuit.

4. The charging system according to claim 3, wherein the energy absorption circuit further comprises:
   a second switch, a first terminal of the second switch being connected to the first terminal of the dissipating device, and a second terminal of the second switch being connected to the first terminal of the charging circuit.

5. The charging system according to claim 1, wherein the voltage stability control circuit comprises:
   an AC-DC module connected to the input port; and
   a DC-DC module connected to the AC-DC module and the output port.

6. The charging system according to claim 5, wherein the energy absorption circuit is connected between the input port and the AC-DC module; or
   the energy absorption circuit is connected between the AC-DC module and the DC-DC module; or the energy absorption circuit is connected between the DC-DC module and the output port.

7. The charging system of claim 1, wherein the EMS is further configured to:

obtain a number of times for the charging device being charged with the negative pulse current;

control the charging device to charge the battery unidirectionally with the positive pulse current when the number reaches a threshold; and control the charging device to charge the battery with the positive pulse current during the first period when the number does not reach the threshold.

8. A charging control method, the method being applied performed by an energy management system (EMS), the EMS being connected to a charging device, the charging device being connectable to a battery and an energy absorption circuit, wherein the charging device comprises a charging circuit, the charging circuit comprises a voltage stability control circuit, an output port, and an input port, the charging circuit is configured to receive a high-voltage alternating current through the input port and is connected to a battery through the output port, the voltage stability control circuit is configured to convert the high-voltage alternating current into a low-voltage direct current, and the method comprises comprising:

connecting the charging device to the battery;

controlling the charging device to charge the battery unidirectionally with a positive pulse current of the low-voltage direct current when the battery does not support a negative pulse charging strategy;

controlling the charging device to charge the battery with the positive pulse current during a first period when the battery supports the negative pulse charging strategy; and controlling the charging device to charge the battery with a negative pulse current of the low-voltage direct current during a second period, and controlling the energy absorption circuit to absorb the negative pulse current.

9. The method of claim 8, wherein after controlling the energy absorption circuit to absorb the negative pulse current, the method further comprises:

obtaining a number of times for the charging device being charged with the negative pulse current;

controlling the charging device to charge the battery unidirectionally with the positive pulse current when the number reaches a threshold; and controlling the charging device to charge the battery with the positive pulse current during the first period when the number does not reach the threshold.

10. An energy management system, comprising:

a processor; and a memory, wherein programs or instructions are stored on the memory and executable on the processor, the programs or the instructions, when executed by the processor, perform the steps of the charging control method according to claim 8.

11. A non-transitory computer-readable storage medium having programs or instructions stored thereon, wherein the programs or the instructions, when executed by the processor, perform the steps of the charging control method according to claim 8.

\* \* \* \* \*